June 22, 1926.
P. PIERCE
1,589,816
CONTROL MECHANISM FOR WRAPPING MACHINES
Filed Jan. 9, 1926    2 Sheets-Sheet 1
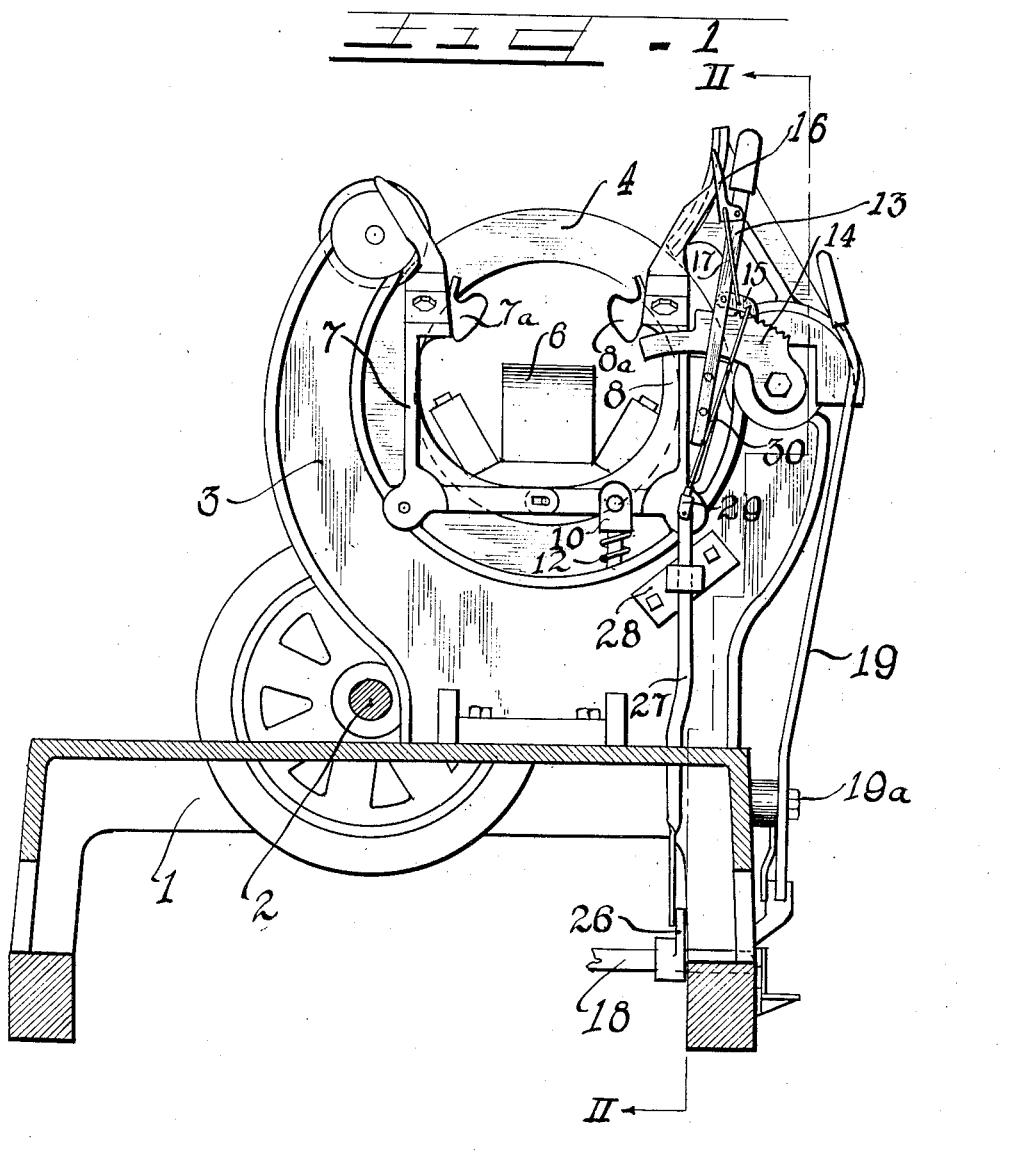
INVENTOR
Paul Pierce
Charles Hill
ATTYS

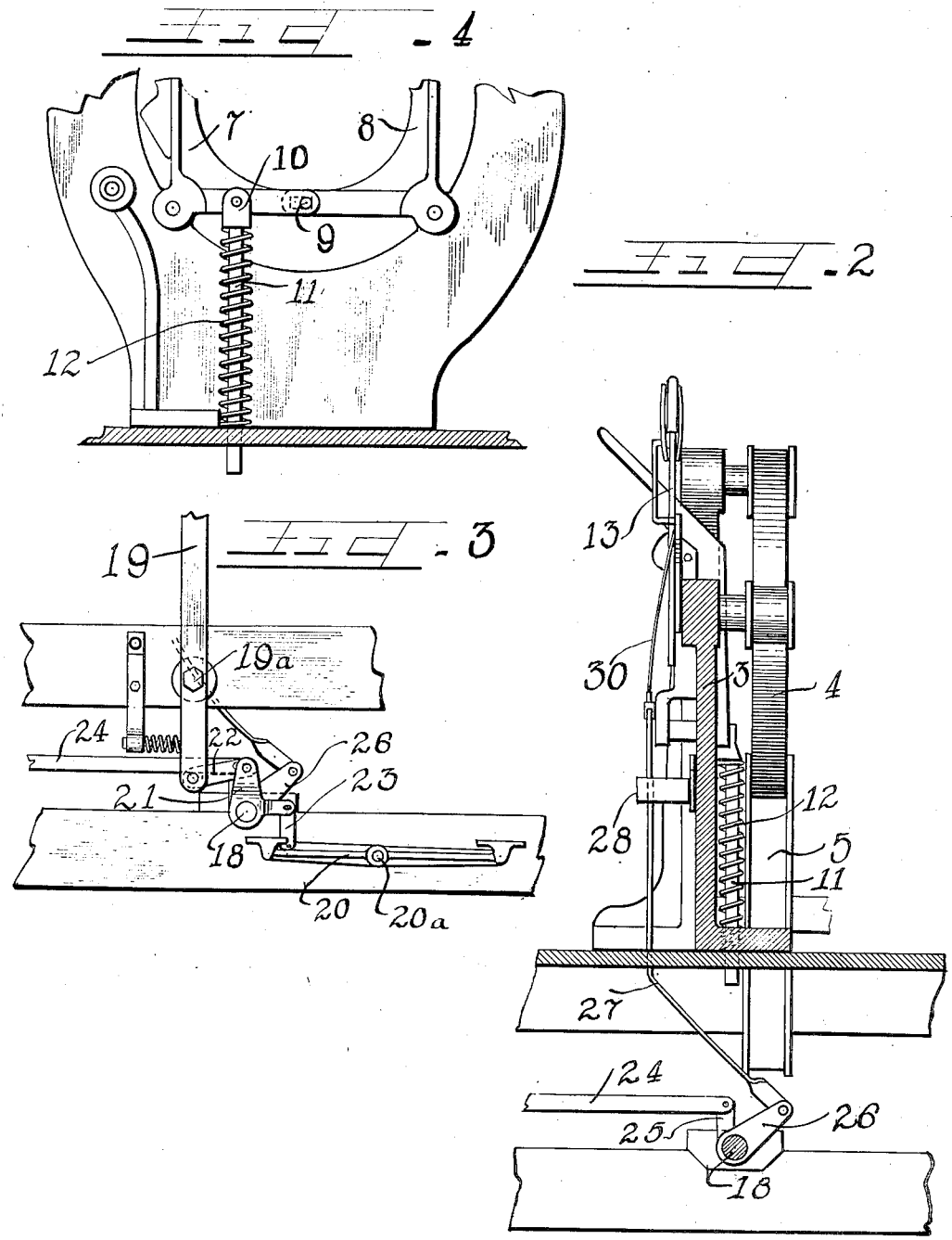

Patented June 22, 1926.

1,589,816

UNITED STATES PATENT OFFICE.

PAUL PIERCE, OF CHICAGO, ILLINOIS.

CONTROL MECHANISM FOR WRAPPING MACHINES.

Application filed January 9, 1926. Serial No. 80,253.

This invention relates to control mechanism for wrapping machines and particularly to a mechanism which is adapted to be used in connection with the tire wrapping machines for automatically positioning the bead pressing or tire guiding devices, to permit ready removal of the tire upon stopping the machine.

It is an important object of the present invention to provide means for automatically releasing the bead pressing or tire guiding devices of a tire wrapping machine when the machine is stopped.

A further important object of this invention is to provide a control mechanism of the class described which permits of accurate manual adjustment of the bead pressing or tire guiding means relative to the tire casing.

Other and further important objects of this invention will be apparent from the disclosures in the specification and the accompanying drawings.

The invention (in a preferred form) is shown on the drawings and hereinafter more fully described.

On the drawings:

Figure 1 is a fragmentary front elevational view with parts in section showing a wrapping machine equipped with the improved control mechanism of this invention.

Figure 2 is an enlarged fragmentary section on the line II—II of Figure 1 with parts in elevation.

Figure 3 is an enlarged fragmentary side elevation of a part of the control mechanism.

Figure 4 is an enlarged fragmentary front elevation of the shuttle frame showing a part of the actuating means for the control mechanism of this invention.

As shown on the drawings:

The reference numeral 1 indicates the base frame or supporting structure of a usual tire wrapping machine. This machine is provided with a main drive shaft 2 to which power is applied by means of a clutch connection, (not shown), to a suitable power source. Supported on the base frame 1 is a shuttle supporting yoke or frame 3 in which a shuttle 4 is rotatably supported in the usual manner, said shuttle 4 being driven by frictional contact of the periphery thereof with a friction pulley 5 mounted on the main drive shaft 2.

The tire or other annular article to be wrapped is rotatably supported on a pair of supporting and driving rolls, one of which is shown at 6 in Figure 1, said supporting and driving rolls rotate the tire through the eye of the shuttle when the machine is in operation, and the relative rotation of said tire and shuttle affects the application of helical wrapping in a manner which is well known in the art to which this invention pertains.

In order that the tire which is being wrapped may be properly guided through the eye of the shuttle 4 and in order that the beads of said tire may, if desired, be properly pressed together to facilitate the proper application of wrapping material, bead pressing or tire guiding means are provided. These means comprise a pair of bell crank arms 7 and 8 which are respectively pivoted at each side of the shuttle frame 3 as shown in Figures 1 and 4 and the horizontal arms of said levers are pivotally secured together by a sliding or lost motion connection as clearly shown at 9 in Figure 4. The upwardly extending or vertical arm of said levers 7 and 8 are respectively provided with bead pressing devices $7^a$ and $8^a$, which engage the beads or side walls of the tire to properly compress and guide the same. Pivotally secured to the horizontal arm on the bell crank lever 7, is a clevis 10 which is secured to the upper end of a vertical rod 11 which extends downwardly from said clevis through an aperture in the floor of the base frame 1, as clearly shown in Figure 4. Engaged around the rod 11 between the upper side of the floor of the base frame 1 and the lower side of said clevis 10, is a helical spring 12 which is normally under compression and which tends to force the horizontal arms of the bell crank levers 7 and 8 upwardly by pressing upwardly on the lower side of said clevis 10. It will thus be evident that the provision of said spring 12 as above described will tend to normally force the bead press and guide means $7^a$ and $8^a$ away from the tire and it is therefore necessary to provide means for holding said bead pressing or tire guiding devices in operative position against the side walls of the tire. For this purpose I have provided a lever 13 which is rigidly secured to the vertical portion of the bell crank portion 8 and which may be actuated to move said bell lever and the attached bell crank lever 7 inwardly toward the tire in opposition to the action of the helical spring 12, which tends to hold said levers apart. In order that said lever 13 and consequently the bead pressing or tire guiding devices 7ª and 8ª may be locked in desired adjusted position there is provided a notched segment 14 which is rigidly secured to the shuttle frame 3 and which cooperates with a usual locking pawl 15, pivotally mounted on the lever 13 as shown in Figure 1. Said locking pawl 15 may be actuated by a usual hand grip 16 which is pivoted on the lever 13 and which is connected to said pawl by a link 17. This hand grip mechanism is used for positioning the locking pawl 15 when the tire is inserted in the machine.

In existing types of tire wrapping machines with which I am familiar the hand grip mechanism is used both for positioning and releasing the pawl 15. This method of operation, however, requires considerable time and the present invention particularly concerns itself with the provision of means of automatically releasing the pawl 15 and permitting the bell crank levers 7 and 8 to be automatically forced apart into tire releasing position by the spring 12. The automatic control mechanism which I have provided for this purpose may be conveniently interconnected with the tire wrapping machine clutch control mechanism which is operatively connected to a clutch control shaft 18, said shaft being rotated to engage or dis-engage the machine clutch by means of a hand lever 19 or a foot lever 20, said hand lever being pivoted on the base frame 1 at 19ª and the foot lever being pivoted on said base frame at 20ª. Secured to the outer end of the shaft 18 is a bell crank lever 21, one arm of which has pivotally connected thereto a link 22, which in turn is pivotally secured to the lower end of the hand lever 19. Pivotally connected to the other arm of said bell crank lever 21 is one end of a link 23 which has its other end pivotally connected to one end of the foot lever 20, as clearly shown in Figure 3. A suitable motor brake actuated link is also actuated from the shaft 18 through a crank connection therewith as shown at 25 in Figure 2. In order that the pawl 15 may be released each time the shaft 18 is actuated by the hand lever 19 or the foot lever 20 to release the clutch and thus stop the machine, I have provided a crank arm 26 which is secured to said shaft 18 as shown in Figures 1, 2 and 3. Pivotally connected to the outer end of said crank arm 26 is a link or rod 27, which extends upwardly through a guide 28 secured to the face of the shuttle frame 1. Pivotally secured to the upper end of said rod 27 is a clevis 29 which has connected through an upwardly extending link 30, the upper end of which is pivotally secured to the outer end of the pawl 15, as clearly shown in Figure 1. Consequently by virtue of this connection from the shaft 18 to the pawl 15, when said shaft is turned to the left in Figure 2, the rod 27 and the link 30 will be moved upwardly to release the pawl 15. The release of said pawl 15, of course, permits the vertical arms of the levers 7 and 8 to be moved apart by the action of the spring 12 and the tire is thus automatically released when the shaft 18 is actuated to stop the machine.

By the provision of this apparatus the operation of tire wrapping machines equipped therewith is greatly facilitated since the necessity of an additional operation on the part of the operator to release the tire from the guide or bead pressing means is obviated. At the same time the operation may accurately control the degree of pressure against the tire and the relative position of the pressing or guiding means by the hand lever 13.

I am aware that many changes may be made, and numerous details of construction may be varied through a wide range without departing from the principles of this invention, and I therefore do not purpose limiting the patent granted hereon otherwise than necessitated by the prior art.

I claim as my invention:

1. In a tire wrapping machine, means for engaging the side walls of a tire, means tending to force said first mentioned means away from the tire, and releasable means for locking said first mentioned means in tire engaging position against the action of said second mentioned means.

2. In combination a tire wrapping machine, a control mechanism therefor, bead pressing means, means tending to normally force said bead pressing means to part, means for locking said bead pressing means in desired adjusted position and means actuated by the operation of the control mechanism for automatically releasing said locking means.

3. In combination a tire wrapping machine, bead pressing or guide means movably mounted on said machine, resilient means tending to normally force said bead pressing means apart, means for locking said bead pressing means in adjusted position, a control mechanism for starting and stopping the machine and means actuated by said control mechanism for releasing said locking means when the machine is stopped.

4. In combination a tire wrapping machine, pivotally mounted means associated therewith for engaging the side walls of a tire, means normally tending to hold said last mentioned means away from the tire, means for locking said tire engaging means in adjusted position, and means for automatically releasing said locking means when the machine is stopped.

5. In a tire wrapping machine, spring released means for engaging the side walls of a tire, means for locking said engaging means in adjusted position, and means for releasing said locking means when the machine is stopped.

6. In a tire wrapping machine, pivotally mounted spring released means for engaging the side walls of a tire, means for locking said engaging means in adjusted position and means for releasing said locking means when the machine is stopped.

7. In a tire wrapping machine, automatically releasable bead pressing or guiding means, means for locking said pressing or guiding means in adjusted position, and means associated with the wrapping machine control mechanism for releasing said locking means.

8. In a wrapping machine, a rotatable shuttle means for supporting and rotating a tire to be wrapped, drive for said shuttle and supporting means, a control mechanism for said drive, bead pressing and guiding means pivotally mounted on said machine, resilient means tending to hold said bead pressing and guiding means away from the tire, manual operable means for positioning said pressing and guiding means and locking the said pressing and guiding means in an adjusted position, and a connection from said last mentioned means to the control mechanism for releasing the locking means when said mechanism is actuated to stop the machine.

9. In a tire wrapping machine, a control mechanism, means for engaging the side walls of a tire while the same is being wrapped, and resilient means associated with the control mechanism for automatically moving said tire engaging means to inoperative position.

In testimony whereof I have hereunto subscribed my name.

PAUL PIERCE.